(12) United States Patent
Rosenfield

(10) Patent No.: US 10,482,282 B1
(45) Date of Patent: *Nov. 19, 2019

(54) MANAGEMENT OF A SOCIAL NETWORK CONTACT GROUP THROUGH THE USE OF EMBEDDED LIMITATIONS

(71) Applicant: Jeffrey M. Rosenfield, Naples, FL (US)

(72) Inventor: Jeffrey M. Rosenfield, Naples, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/182,654

(22) Filed: Nov. 7, 2018

Related U.S. Application Data

(63) Continuation-in-part of application No. 15/397,048, filed on Jan. 3, 2017, now Pat. No. 10,154,043.

(51) Int. Cl.
*G06F 21/62* (2013.01)
*H04L 29/06* (2006.01)

(52) U.S. Cl.
CPC .......... *G06F 21/6245* (2013.01); *H04L 63/10* (2013.01); *H04L 63/102* (2013.01); *H04L 63/104* (2013.01); *H04L 63/105* (2013.01)

(58) Field of Classification Search
CPC . G06F 21/6245; H04L 63/102; H04L 63/104; H04L 63/10; H04L 63/105
See application file for complete search history.

(56) References Cited

U.S. PATENT DOCUMENTS

| | | | |
|---|---|---|---|
| 7,805,406 B2 | 9/2010 | Craig | |
| 7,904,511 B2 | 2/2011 | Ryan et al. | |
| 8,015,119 B2 | 9/2011 | Buyukkokten et al. | |
| 8,291,477 B2* | 10/2012 | Lunt | H04L 51/12 726/4 |
| 8,707,394 B2 | 4/2014 | Tam et al. | |
| 8,965,967 B2 | 2/2015 | Gilbert | |
| 9,104,681 B2* | 8/2015 | Kang | G06Q 30/02 |
| 2005/0198031 A1* | 9/2005 | Pezaris | H04L 51/32 |
| 2008/0189122 A1* | 8/2008 | Coletrane | G06Q 10/107 705/319 |
| 2012/0246087 A1* | 9/2012 | Talati | G06Q 30/08 705/319 |
| 2012/0271722 A1 | 10/2012 | Juan et al. | |
| 2014/0222445 A1* | 8/2014 | Bischoff | G06Q 50/22 705/2 |
| 2015/0082462 A1 | 3/2015 | Pearlman et al. | |

OTHER PUBLICATIONS path.com printout.
efamilyleaf.com printout.

* cited by examiner

*Primary Examiner* — Ayoub Alata
(74) *Attorney, Agent, or Firm* — Edward M. Livingston, Esq.; Bryan L. Loeffler, Esq.; Livingston Loeffler, P.A.

(57) ABSTRACT

A social networking system wherein an individual may set up a personal profile to share with a select group of friends and/or family. The system and method of the present invention implements embedded limitations that maintains a core group of contacts specific to the user's profile.

21 Claims, 3 Drawing Sheets

MANAGEMENT OF A SOCIAL NETWORK CONTACT GROUP THROUGH THE USE OF EMBEDDED LIMITATIONS

CROSS-REFERENCE TO RELATED APPLICATIONS

This application is a continuation-in-part of application Ser. No. 15/397,048 filed on Jan. 3, 2017. The patent application identified above is incorporated herein by reference in its entirety to provide continuity of disclosure.

FIELD OF THE INVENTION

This invention relates to social network services and more particularly to a system and method for creation of a targeted group of contacts through the use of limitations within an online social network service.

BACKGROUND OF THE INVENTION

Online social network services bring individuals together in communities based on common access to the same online social network service. These online communities may facilitate communication among individual users of an online social network service based on pre-established relationships between the individual users. Such connections may be based on common interests, circumstances, friendships, family relationships, business relationships, and the like. Many online social network services allow users to enter personal information to establish a profile that is visible to other users of the online social network service. A user's profile may be made public or private by manually entering a myriad of commands that can be confusing, easily forgotten after being set and/or easily circumvented by third parties with a desire to view the user's profile. In either case, the user is hesitant to share personal information as they are unsure which connections and/or third parties will be able to access the information.

These privacy concerns cause many users to limit their use of a social network and/or cease use altogether. This is a problem specific to online computer networks wherein the sharing of information is conducted.

Therefore, a need exists for a system and method for managing a social network profile through the use of embedded limitations to ensure a user's privacy from the creation of the profile and throughout the life of the profile, thereby encouraging greater sharing of personal information and use of the social network.

SUMMARY OF THE INVENTION

The primary object of the present invention is to provide a system and method for managing a social network profile through the use of embedded limitations to ensure a user's privacy from the creation of the profile and throughout the life of the profile, thereby encouraging greater sharing of personal information and use of the social network.

The present invention fulfills the above and other objects by providing a social networking system wherein an individual may set up a personal profile to share with a select group of friends and/or family. The system and method of the present invention implements embedded limitations that maintains a core group limited to twenty contacts all of whom are specific to the user's profile, thereby promoting more meaningful exchanges without privacy concerns of personal information being viewed by third parties.

The privacy concerns that cause many users to limit their use of a social network and/or cease use altogether is a problem specific to online computer networks wherein the sharing of information is conducted. The system and method of the present invention implements embedded limitations. The use of these embedded limitations or rules by a computer operating in an online environment sets particular animation parameters that may only be accomplished by operation of the computer or other equivalent electronic device within the online environment.

In an exemplary embodiment, actions by profile owners or users and third parties in relation to a specific social network profile are accounted for and analyzed in comparison with one or more embedded limitations to determine if the actions should be allowed or denied. The actions may be positive or negative to allow the social networking system to identify the actions within specified ranges and adjust the ranges in accordance with the embedded limitation. Actions of a user may close an embedded limitation, thereby disallowing further actions to be taken, or open an embedded limitation, thereby allowing further actions to be taken. For example, the positive action of adding a contact to a core group of contacts may maximize a predetermined range having a maximum number of twenty and thus, close an embedded limitation on the number of allowed contacts within the core group, thereby preventing the further addition of contacts to the core group. Likewise, the negative action of a removal of a contact from the core group will open the predetermined range and open the embedded limitation if it drops the number of contacts within the group below twenty. In addition, the positive action of a third party, such as a request, may force a user or profile owner to take a negative action to open an embedded limitation, such as removing a contact from his or her core group of contacts, thereby opening the embedded limitation to allow the third party request.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
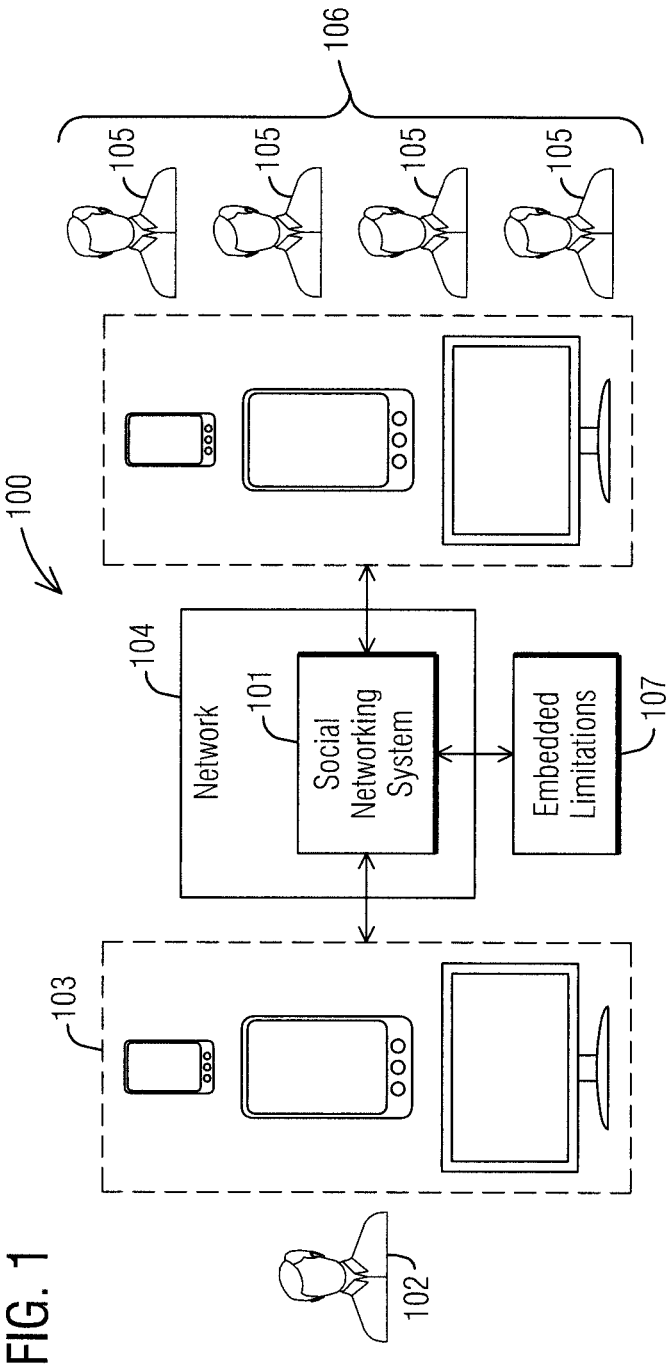
FIG. 1 is a schematic diagram showing an online social network in which the system and method of the present invention operates.

With reference to FIG. 1, a schematic diagram showing an online social network 100 in which the system and method of the present invention operates is illustrated. A social networking system 101 is accessed by a user 102 though a terminal 103, such as a computer, smart phone, tablet or equivalent device, over a computer network 104 in order to exchange information with third parties 105 that are members of the user's 102 contact group 106. The social networking system 101 comprises at least one embedded limitation 107 that prevents one or more actions by the user 102. An example of an embedded limitation may be a limited number of contacts the user 102 is allowed to have at any one time, such as a maximum of twenty contacts. A range of specified allowable user positive actions forming a select core group of contacts may have a maximum of five, ten, fifteen, twenty, twenty-five, thirty, thirty-five, forty, forty-five, fifty, fifty-five, sixty, sixty-five, seventy, seventy-five, eighty, eighty-five, ninety, ninety-five, one-hundred contacts, or any number in-between and so forth.

Figure 2:
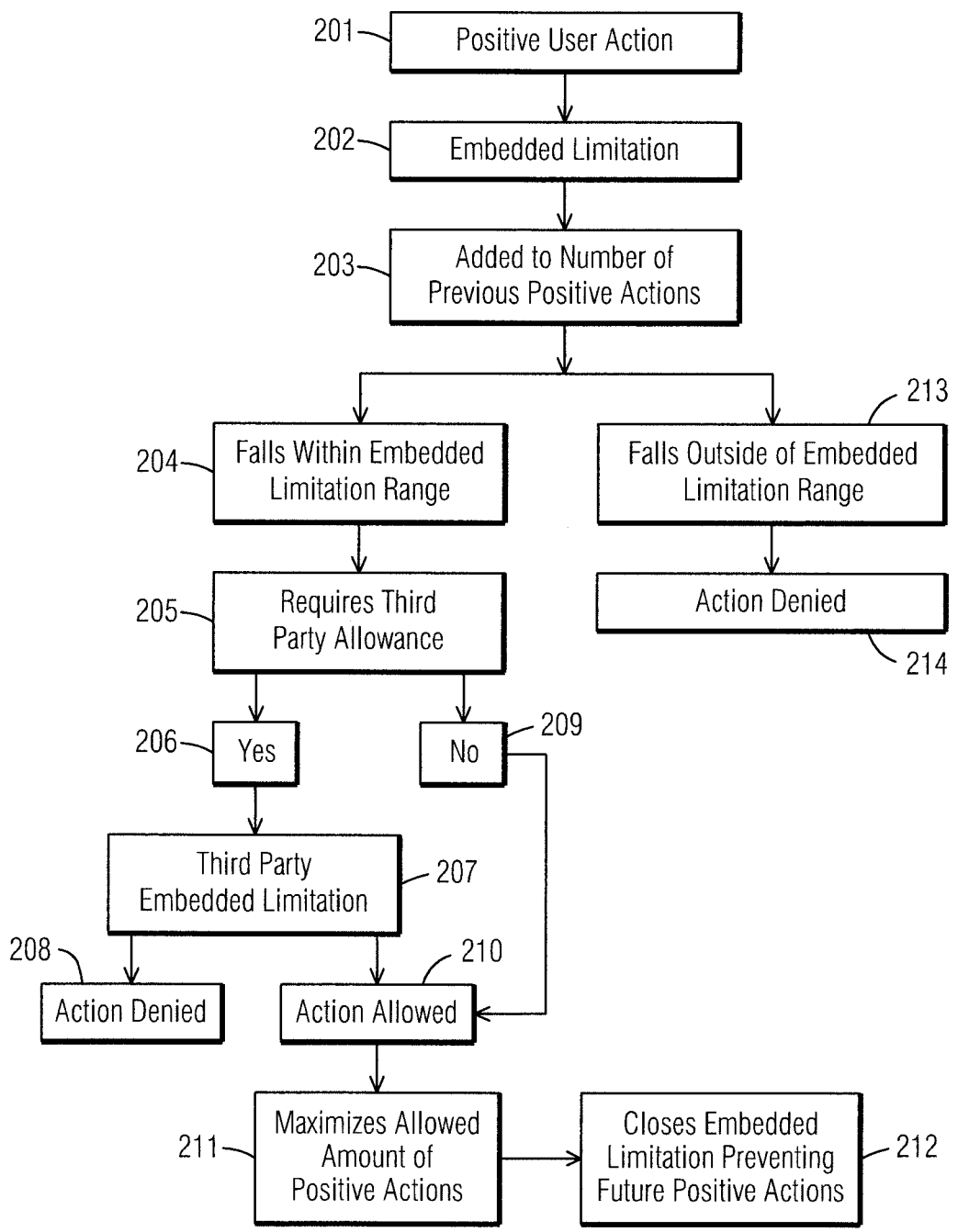
FIG. 2 is a flow chart showing the steps of a processing a user positive action within a limit of an embedded limitation of the present invention.
Figure 4:
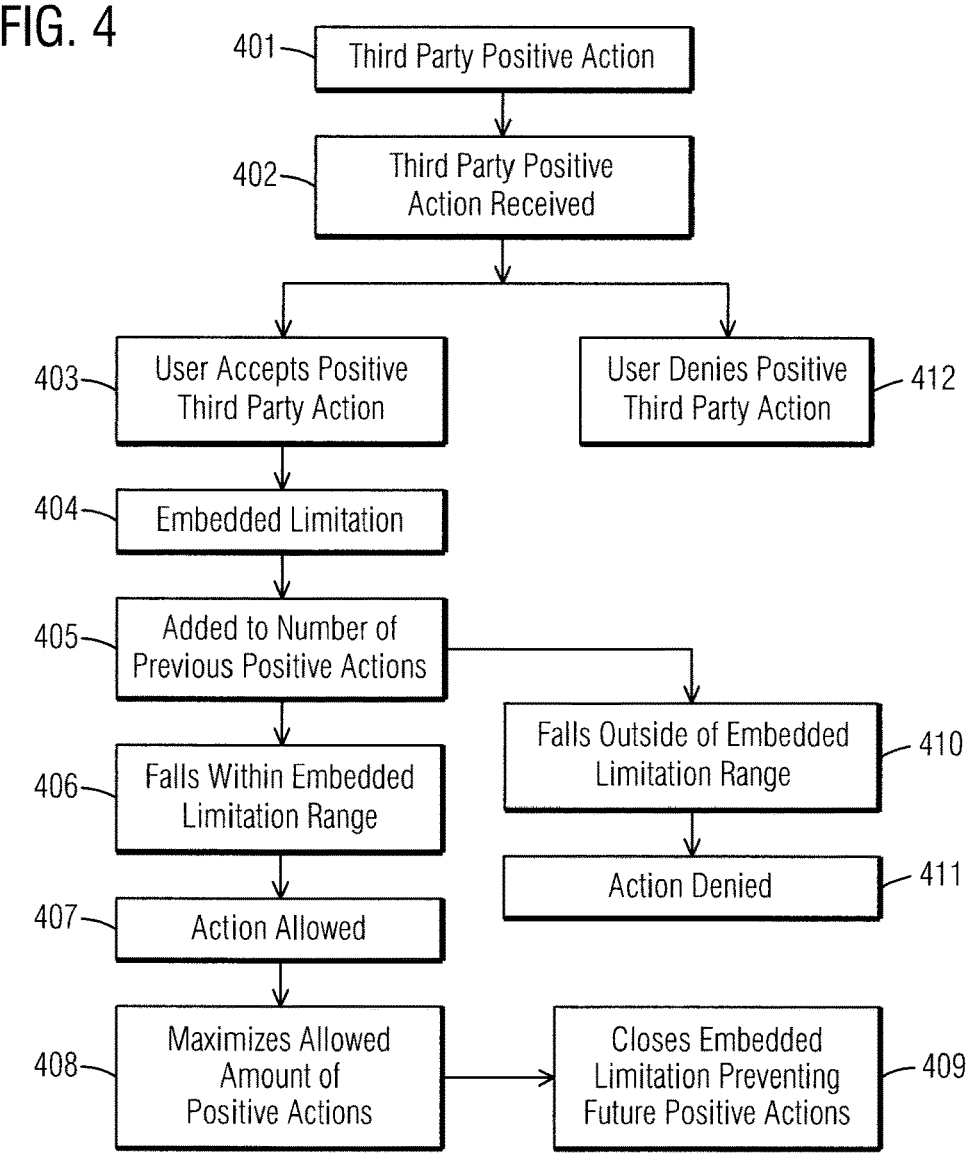
FIG. 4 is a flow chart showing the steps of a processing a third party positive action of the present invention.

With reference to FIG. 2, a flow chart showing the steps of processing a user positive action within a limit of an embedded limitation of the present invention are illustrated. First, a user positive action 201 is created by initiating a request within the social networking system. An embedded limitation 202 of the present invention may comprise a range of allowable specified positive actions, such as the addition of a contact to a core group of contacts. The user positive action is added to a number of previously allowed positive actions 203. If the sum falls within the allowable range of the embedded limitation 204, then the user positive action will be checked for any required third party allowances 205. If a third party allowance is required 206, then the positive user request will be analyzed as a third party request of another user's at least one embedded limitation 207 (as illustrated in FIG. 4). For example, the other user's maximum allowed number of contacts may be twenty. Then, the user positive action will either be denied 208 or allowed 210 based on the other user's at least one embedded limitation 207. For example, the user positive action will be denied 208 if the other user currently has twenty contacts or allowed 210 if the other user has less than twenty contacts.

If a third party allowance is not required 209, then the user positive action will be allowed 210. If the user positive action is allowed 210 and the resulting sum maximizes the allowed amount of positive actions allowed within the range of the embedded limitation 211, then the embedded limitation is closed to prevent further allowance of positive user actions 212. If the resulting sum of the user positive action being added to the number of previously allowed positive actions 203 falls outside of the allowable range of the embedded limitation 213, for example greater than twenty contacts, then the user positive action is denied 214.

Figure 3:
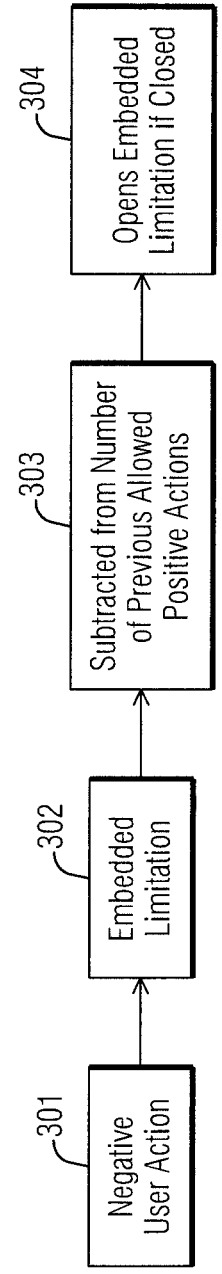
FIG. 3 is a flow chart showing the steps of a closed embedded limitation being opened by a user negative action.

With reference to FIG. 3, a flow chart showing the steps of a closed embedded limitation being opened by a user negative action are illustrated. After an embedded limitation is closed, the user may initiate a user negative action 301, such as removing a contact from a core group of contacts, which reverses a previous specified user positive action to open the closed embedded limitation 302 range by reversing a previous specified positive action, thereby allowing a future specified positive action to fall within the range of allowable specified positive actions after the user negative action is subtracted from the previously allowed positive actions 303. After the user negative action is subtracted from the previously allowed positive actions 303, the embedded limitation is opened 304, thereby causing the user to only exchange information with contacts within the parameters set forth by the at least one embedded limitation of the present system and method.

For example, a user may have an embedded limitation wherein the range of allowable specified positive actions has a maximum amount of twenty, thus resulting in a maximum number of contacts in a core group of contacts being twenty contacts. Therefore, a user positive action would comprise adding a contact to the core group and a user negative action would comprise removing a contact from the core group of contacts.

With reference to FIG. 4, a flow chart showing the steps of processing a third party positive action of the present invention are illustrated. First, a third party positive action 401 directed toward a specified user is received within the social networking system 402. The user may deny the third party positive action 412 or accept the third party positive action 403. An embedded limitation 404 of the present invention may comprise a range of allowable specified positive user actions. The third party positive action is added to a number of previously allowed positive actions 405. If the sum falls within the allowable range of the embedded limitation 406, then the third party positive action is allowed 407. If the third party positive action is allowed and the resulting sum falls within the allowable range of the embedded limitation 406, and maximizes the allowed amount of positive actions allowed within the range of the embedded limitation 408, then the embedded limitation is closed to prevent further allowance of positive actions 409. If the resulting sum of the third party positive action being added to the number of previously allowed positive actions 405 falls outside of the allowable range of the embedded limitation 410, then the user positive action is denied 411.

For example, a user may have an embedded limitation wherein the range of allowable specified positive actions has a maximum amount of twenty, thus resulting in a maximum number of contacts in a core group of contacts being twenty contacts. Therefore, a third party positive action would comprise adding a contact to the core group.

Figure 5:
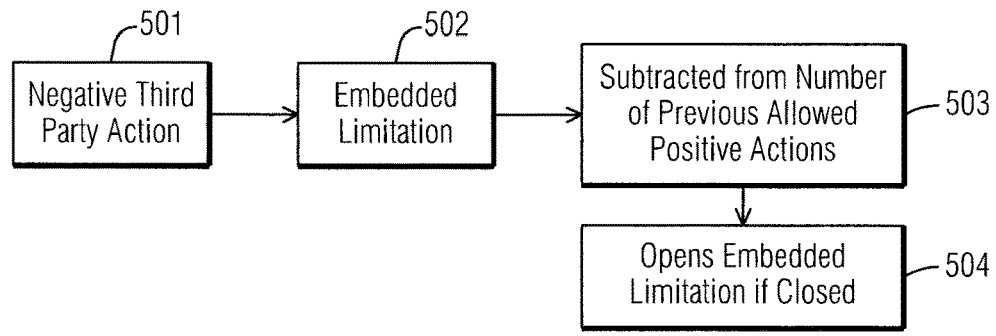
FIG. 5 is a flow chart showing the steps of a closed embedded limitation being opened by a third party negative action.

With reference to FIG. 5, a flow chart showing the steps of a closed embedded limitation being opened by a third party negative action are illustrated. After an embedded limitation is closed, a third party negative action 501 may reverse a previous specified positive action to open the closed embedded limitation 502 of a user within the social network system by reversing a previous specified positive action, thereby allowing a future specified positive action to fall within the range of allowable specified positive actions after the third party negative action is subtracted from the previously allowed positive actions 503. After the third party negative action is subtracted from the previously allowed positive actions 503, the embedded limitation is opened 504, thereby causing the user to only exchange information with contacts within the parameters set forth by the at least one embedded limitation of the present system and method.

For example, a user may have an embedded limitation wherein the range of allowable specified positive actions has a maximum amount of twenty, thus resulting in a maximum number of contacts in a core group of contacts being twenty contacts. Therefore, a third party negative action would comprise subtracting a contact from the core group.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A social networking system comprising: an online network in which the social networking system operates via a hardware processor and memory; at least one terminal connected to said social networking system through said online network; an embedded limitation located within the social networking system that defines a range of specified allowable user positive actions; said range of specified allowable user positive actions forms a select core group of contacts; said user positive action being analyzed within the online network in accordance with the embedded limitation to determine if the user positive action falls within a limitation range of the embedded limitation; a first determination being made within the social networking system that the user positive action falls within the limitation range of the embedded limitation and that the positive user action will be allowed within the social networking system based on the first determination; said user positive action being analyzed within the online network in accordance with a third party allowance to determine if the third party allowance is required user; a second determination being made that the user positive action does not require the third party allowance and that the positive user action will be allowed within the social networking system based on the second determination; said user positive action being added to previously allowed user positive actions based on the first determination and the second determination; said embedded limitation being closed based on the user positive action being added to previously allowed user positive actions; a user negative action being received within the social networking system; said user negative action being analyzed within the online network in accordance with the embedded limitation; said user negative action being subtracted from previously allowed positive actions; and said embedded limitation being opened based on the user negative action being subtracted from previously allowed positive actions.

2. The social networking system of claim 1 wherein: said range of specified allowable user positive actions forms a select core group of contacts having a maximum of twenty contacts.

3. The social networking system of claim 1 wherein: said range of specified allowable user positive actions forms a select core group of contacts having a maximum of five contacts.

4. The social networking system of claim 1 wherein: said range of specified allowable user positive actions forms a select core group of contacts having a maximum of ten contacts.

5. The social networking system of claim 1 wherein: said range of specified allowable user positive actions forms a select core group of contacts having a maximum of fifteen contacts.

6. The social networking system of claim 1 wherein: said range of specified allowable user positive actions forms a select core group of contacts having a maximum of twenty-five contacts.

7. The social networking system of claim 1 wherein: said range of specified allowable user positive actions forms a select core group of contacts having a maximum of thirty contacts.

8. The social networking system of claim 1 wherein: said range of specified allowable user positive actions forms a select core group of contacts having a maximum of thirty-five contacts.

9. The social networking system of claim 1 wherein: said range of specified allowable user positive actions forms a select core group of contacts having a maximum of forty contacts.

10. The social networking system of claim 1 wherein: said range of specified allowable user positive actions forms a select core group of contacts having a maximum of forty-five contacts.

11. The social networking system of claim 1 wherein: said range of specified allowable user positive actions forms a select core group of contacts having a maximum of fifty contacts.

12. The social networking system of claim 1 wherein: said range of specified allowable user positive actions forms a select core group of contacts having a maximum of fifty-five contacts.

13. The social networking system of claim 1 wherein: said range of specified allowable user positive actions forms a select core group of contacts having a maximum of sixty contacts.

14. The social networking system of claim 1 wherein: said range of specified allowable user positive actions forms a select core group of contacts having a maximum of sixty-five contacts.

15. The social networking system of claim 1 wherein: said range of specified allowable user positive actions forms a select core group of contacts having a maximum of seventy contacts.

16. The social networking system of claim 1 wherein: said range of specified allowable user positive actions forms a select core group of contacts having a maximum of seventy-five contacts.

17. The social networking system of claim 1 wherein: said range of specified allowable user positive actions forms a select core group of contacts having a maximum of eighty contacts.

18. The social networking system of claim 1 wherein: said range of specified allowable user positive actions forms a select core group of contacts having a maximum of eighty-five contacts.

19. The social networking system of claim 1 wherein: said range of specified allowable user positive actions forms a select core group of contacts having a maximum of ninety contacts.

20. The social networking system of claim 1 wherein: said range of specified allowable user positive actions forms a select core group of contacts having a maximum of ninety-five contacts.

21. The social networking system of claim 1 wherein: said range of specified allowable user positive actions forms a select core group of contacts having a maximum of one hundred contacts.

* * * * *